US012810328B1

(12) United States Patent
Cho et al.

(10) Patent No.: US 12,810,328 B1
(45) Date of Patent: Nov. 24, 2026

(54) TARGET MARKETING SYSTEM USING COMBINED ID OF WALLET ADDRESS AND ADVERTISING-ATTRIBUTE INFORMATION AS IDENTIFIER

(71) Applicant: 1SelfWorld Inc., Seoul (KR)

(72) Inventors: Chang Hyun Cho, Seoul (KR); Ho Young Kang, Seoul (KR)

(73) Assignee: 1SELFWORLD INC., Seoul (KR)

(*) Notice: Subject to any disclaimer, the term of this patent is extended or adjusted under 35 U.S.C. 154(b) by 0 days.

(21) Appl. No.: 19/311,132

(22) Filed: Aug. 27, 2025

(51) Int. Cl.
*G06Q 20/40* (2012.01)
*G06Q 30/0251* (2023.01)

(52) U.S. Cl.
CPC ......... *G06Q 30/0271* (2013.01); *G06Q 20/40* (2013.01); *G06Q 2220/00* (2013.01)

(58) Field of Classification Search
CPC . G06Q 30/0271; G06Q 20/40; G06Q 2220/00
See application file for complete search history.

(56) References Cited

U.S. PATENT DOCUMENTS 11,475,484 B1 10/2022 Knab et al.
2023/0281606 A1* 9/2023 Jakobsson ................. H04L 9/50 705/67
2025/0385807 A1* 12/2025 Finlow-Bates ........... H04L 9/50

FOREIGN PATENT DOCUMENTS

JP 2019-185658 10/2019
JP 7239233 3/2023
KR 10-2020-0137154 12/2020
KR 10-2346519 1/2022
KR 10-2022-0087949 6/2022
KR 10-2023-0018779 2/2023
KR 10-2024-0076646 5/2024

* cited by examiner

*Primary Examiner* — Azam A Ansari
(74) *Attorney, Agent, or Firm* — LEX IP MEISTER, PLLC

(57) ABSTRACT

The present invention relates to a target-marketing system that employs, as an identifier, a combined ID formed from a wallet address and advertising-attribute information.

A target-marketing system according to the present invention that employs, as an identifier, a combined ID generated from a wallet address and advertising-attribute information comprises:

a user terminal configured to request, on the basis of user consent, generation of a wallet address on a blockchain and to perform signing and authentication of the wallet address; and a system server configured to (i) utilize the wallet address generated on the blockchain, in response to the user-terminal request, as a unique advertising identifier for digital marketing; (ii) store, on the blockchain as a unique and immutable Soul-Bound Token (SBT), various advertising-attribute information obtained from the user terminal; and (iii) employ, as an identifier for digital marketing, a combined ID produced by linking the wallet address with the advertising-attribute information.

Accordingly, by storing (i) a blockchain-network wallet address and (ii) various advertising-attribute information obtained directly from the user as respective unique and immutable SBTs on the blockchain, and by employing a combined ID—formed by linking these tokens—as the identifier for digital marketing, the invention can enhance information accuracy and improve the efficiency of invigorating the target-marketing market.

10 Claims, 9 Drawing Sheets

100

TARGET MARKETING SYSTEM USING COMBINED ID OF WALLET ADDRESS AND ADVERTISING-ATTRIBUTE INFORMATION AS IDENTIFIER

BACKGROUND OF THE INVENTION

(a) Field of the Invention

This invention relates to a target-marketing system, and more specifically to a system that: (i) stores a blockchain-network wallet address and various advertising attribute information obtained directly from the user as unique and immutable SBTs (Soul Bound Tokens) on the blockchain; and (ii) employs a combined ID—formed by linking the two—as the identifier for digital marketing.

(b) Description of the Related Art

Currently, the mobile advertising market has been criticized for inefficiency arising from: a sharp decline and volatility in target identifiers; low accuracy caused by the limited scope of attribute information; and the monopolization of data and marketing by dominant platforms.

In other words, the principal identifiers in the mobile advertising market are those provided by the device/OS, such as Google Android's ADID (Advertising ID) and Apple IOS's IDFA (Identifier for Advertisers).

Since the introduction of App Tracking Transparency (ATT), the IDFA (Identifier for Advertisers) has become a significant issue.

As an alternative, a fingerprint-based method that tracks IP addresses and the like has been proposed; however, its low accuracy has proven problematic.

Furthermore, because the identifier is replaced each time a mobile phone is replaced, the total number of identifiers continues to accumulate.

Moreover, because the data collected for advertising is limited to factors such as gender, age, occupation, address, workplace, web records (search and browsing history), app-activity logs (installations and activations), and location information, its accuracy remains low—a drawback that has been widely criticized.

Korean Unexamined Patent Publication No. 10-2024-0076646, entitled "Target Marketing Method and System," discloses a target-marketing system comprising:

At least one memory in which a marketing application is stored; and

At least one processor operatively coupled to the memory and configured to read the marketing application and perform target marketing. The marketing application includes instructions which, when executed by the at least one processor, cause the processor to:

i) construct a conversion-prediction model—a deep-learning model for estimating a conversion probability that represents the likelihood that a given user will generate revenue;

ii) construct an uplift model—a deep-learning model for calculating an uplift score that represents the amount of behavioral change of the given user attributable to a marketing campaign;

iii) acquire, based on the conversion-prediction model, the conversion probability for each user;

iv) acquire, based on the uplift model, the uplift score for each user;

v) determine, on the basis of at least one of the conversion probabilities and the uplift score, a target user to whom a first marketing campaign is to be applied; and vi) execute the first marketing campaign for the target user.

In the Patent Document 1 as above, a marketing target is selected through deep-learning analysis, a marketing campaign is executed for the selected target, and the results of the campaign are evaluated, enabling users considered most likely to boost campaign effectiveness to be identified and refined on the basis of objective, quantitative data. However, because the information that can be collected for advertising purposes is inevitably limited to attributes such as gender, age, occupation, address, employer, web activity records (e.g., search and browsing history), app activity logs (e.g., installation and activation history), and location data, the system architecture of Patent Document 1 still suffers from low accuracy.

PRIOR-ART DOCUMENTS

Patent Literature

[Patent Document 1] Korean Unexamined Patent Application Publication No. 10-2024-0076646, published May 30, 2024.

SUMMARY OF THE INVENTION

The present invention has been conceived in view of the foregoing issues, and an object thereof is to provide a target-marketing system that: (i) stores a blockchain-network wallet address and various advertising-attribute information, obtained directly from a user, as respective unique and immutable Soul-Bound Tokens (SBTs) on the blockchain; (ii) links these two to form a combined ID; and (iii) employs the combined ID as the identifier for digital marketing, thereby improving information accuracy and enhancing the efficiency of the mobile target-marketing market.

To achieve the foregoing object, a target-marketing system according to the present invention, which employs—as an identifier—a combined ID formed from a wallet address and advertising-attribute information, comprising:

a user terminal configured to: (i) request, on the basis of user consent, generation of a wallet address on a blockchain; and (ii) perform signing and authentication of the wallet address; and a system server configured to:

i) utilize, as a unique advertising identifier for digital marketing, the wallet address generated on the blockchain in response to the request from the user terminal;

ii) store, as a unique and immutable Soul-Bound Token (SBT) on the blockchain, various advertising-attribute information obtained from the user terminal; and iii) employ, as an identifier for digital marketing, a combined ID produced by linking the wallet address with the advertising-attribute information.

Here, the system server may perform target marketing by utilizing the advertising-attribute information stored on the blockchain as SBTs.

Further, the system server may comprise:

An information-generation unit configured to generate, on the basis of basic information input from the user terminal, information to be embedded in a SBT;

An information-processing unit configured to:

process user IDs;

perform authentication processing for (i) service-response results presented via the user interface and (ii) wallet signatures;

perform authentication processing according to user exposure and participation; and request issuance of a SBT and payment of a reward in accordance with the wallet-signature authentication result;

A blockchain node configured to:

generate, in response to a request from the user terminal, a wallet address on the blockchain;

store the SBT issued by the information-processing unit; and record and store token-unique information and metainformation in the SBT; and An information-storage unit configured to store (i) the information generated by the information-generation unit, (ii) the information processed by the information-processing unit, and (iii) the information recorded and stored in the blockchain node.

In this case, the information-generation unit may further be configured to publish reward and token information.

Additionally, the information-processing unit may collect authentication information from the user terminal, store the collected authentication information in the blockchain node, and authenticate the user on the basis of the stored authentication information.

Additionally, the information-processing unit may analyze the collected advertising-attribute information, issue a SBT based on the analysis, and store the issued SBT in the blockchain node for management.

Additionally, the information-processing unit may provide personalized advertising to the user by utilizing the issued SBT.

Additionally, the information-processing unit may collect the user's advertising-engagement information, record the collected advertising-engagement information in the blockchain node, and analyze the recorded information to measure the effectiveness of the target marketing.

Additionally, the token-unique information stored in the blockchain node may include a name and an ID.

Additionally, the metainformation stored in the blockchain node may include, for example, a SBT image, a holder (wallet address), related survey information, an advertising-attribute-information category, and hashtag information.

Accordingly, by storing (i) a blockchain-network wallet address and (ii) various advertising-attribute information directly obtained from the user as respective unique and immutable Soul-Bound Tokens (SBTs) on the blockchain, and by employing a combined ID—generated by linking these two—as the identifier for digital marketing, the invention enhances information accuracy and increases the efficiency of invigorating the target-marketing market, particularly the mobile target-marketing segment.

Additionally, by storing the wallet address and the advertising-attribute information as SBTs and using the resulting combined ID as the identifier for digital marketing, the system eliminates the need to build a separate OS-level infrastructure when an identifier must be replaced upon handset replacement, thereby reducing the costs associated with constructing such an OS-level system.

DETAILED DESCRIPTION OF THE EMBODIMENTS

The terms and expressions used in this specification and the appended claims are not to be interpreted as limited to their ordinary or dictionary meanings; instead, they should be construed in light of the principle that an inventor may define terminology in order to best describe the invention, and accordingly should be understood to carry meanings and concepts consistent with the technical spirit of the present invention.

Throughout this specification, when a portion is described as "comprising" a particular element, it should be understood—unless expressly stated to the contrary—that the element is not exclusive and that other elements may also be included. Furthermore, throughout the present specification, the terms "unit," "portion," "module," "device," and the like each designate an element that carries out at least one function or operation, and such an element may be implemented in hardware, in software, or in a combination of hardware and software.

The exemplary embodiments of the present invention will now be described in detail with reference to the accompanying drawings.

Figure 1:
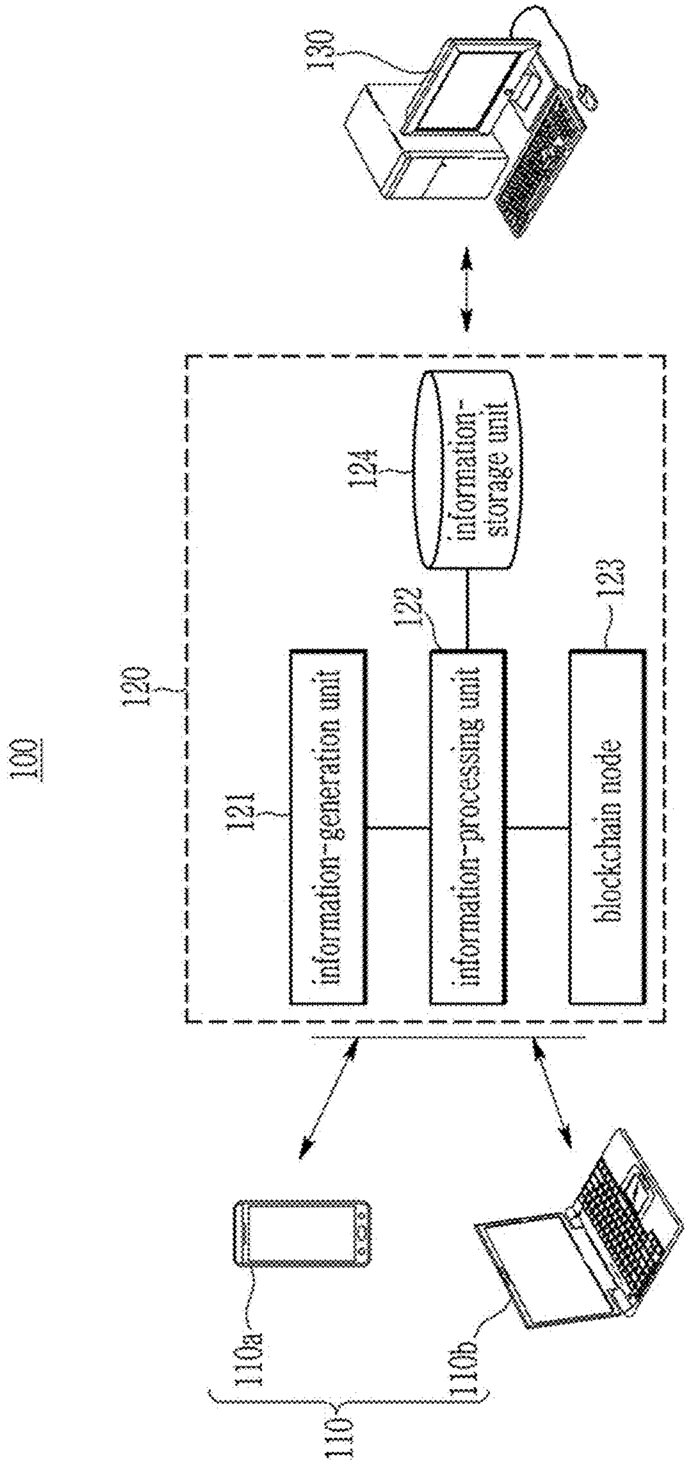
FIG. 1 is a schematic diagram illustrating the configuration of a target-marketing system that employs, as an identifier, a combined ID created from a wallet address and advertising-attribute information in accordance with the present invention.

FIG. 1 is a schematic diagram illustrating, according to an embodiment of the present invention, the configuration of a target-marketing system that employs—as an identifier—a combined ID formed from a wallet address and advertising-attribute information.

Referring to FIG. 1, a target-marketing system 100 that employs—as an identifier—a combined ID formed from a wallet address and advertising-attribute information in accordance with the present invention may be configured to include a user terminal 110 and a system server 120.

The user terminal 110 is configured to request, on the basis of user consent, generation of a wallet address on the blockchain and to perform signing and authentication of the wallet address. The user terminal 110 may be implemented, for example, as a mobile phone (smartphone) 110*a*, a laptop personal computer (PC) 110*b*, a tablet PC, a desktop PC, or the like.

The system server 120 is configured to: (i) utilize, as a unique advertising identifier for digital marketing, the wallet address generated on the blockchain in response to a request from the user terminal 110; (ii) store, as a unique and immutable Soul-Bound Token (SBT) on the blockchain, the various advertising-attribute information obtained from the user terminal 110; and (iii) employ, as an identifier for digital marketing, a combined ID—referred to herein as "Web3ID"—created by linking the wallet address with the advertising-attribute information. Here, the system server 120 may perform target marketing by utilizing the advertising-attribute information stored on the blockchain as SBTs.

Additionally, the system server 120 may be configured to include an information-generation unit 121, an information-processing unit 122, a blockchain node 123, and an information-storage unit 124.

The information-generation unit 121 is configured to generate information to be embedded in a SBT, based on basic information input from the user terminal 110. Here, the information-generation unit 121 may further be configured to publish reward information and token information.

The information-processing unit 122 is configured to: (i) process user IDs; (ii) perform authentication processing for (a) service-response results provided via the user interface and (b) wallet signatures; (iii) perform authentication processing based on user exposure and participation; and (iv) request issuance of a SBT and payment of a reward in accordance with the result of the user wallet-signature authentication. Here, the information-processing unit 122 may collect authentication information from the user terminal 110, store the collected authentication information in the blockchain node 123, and authenticate the user on the basis of the stored authentication information. Additionally, the information-processing unit 122 may analyze the collected advertising-attribute information, issue a SBT on the basis of the analysis, and store the issued SBT in the blockchain node 123 for management. Additionally, the information-processing unit 122 may provide personalized advertising to the user by utilizing the issued SBT. Additionally, the information-processing unit 122 may collect the user's advertising-engagement information, record the collected advertising-engagement information in the blockchain node 123, and analyze the recorded information to measure the effectiveness of the target marketing.

The blockchain node 123 is configured to store the SBT issued by the information-processing unit 122 and to record and store token-unique information and metainformation in the SBT. Here, the token-unique information stored in the blockchain node 123 may include a name and an ID. Additionally, the metainformation stored in the blockchain node 123 may include, for example, a SBT image, a holder (wallet address), an advertising-attribute-information category, and hashtag information.

The information-storage unit 124 is configured to store: (i) the information generated by the information-generation unit 121; (ii) the information processed by the information-processing unit 122; and (iii) the information recorded and stored in the blockchain node 123.

Hereinafter, additional description will be provided regarding the target-marketing system 100 that employs—as an identifier—a combined ID formed from a wallet address and advertising-attribute information in accordance with the present invention.

Figure 2:
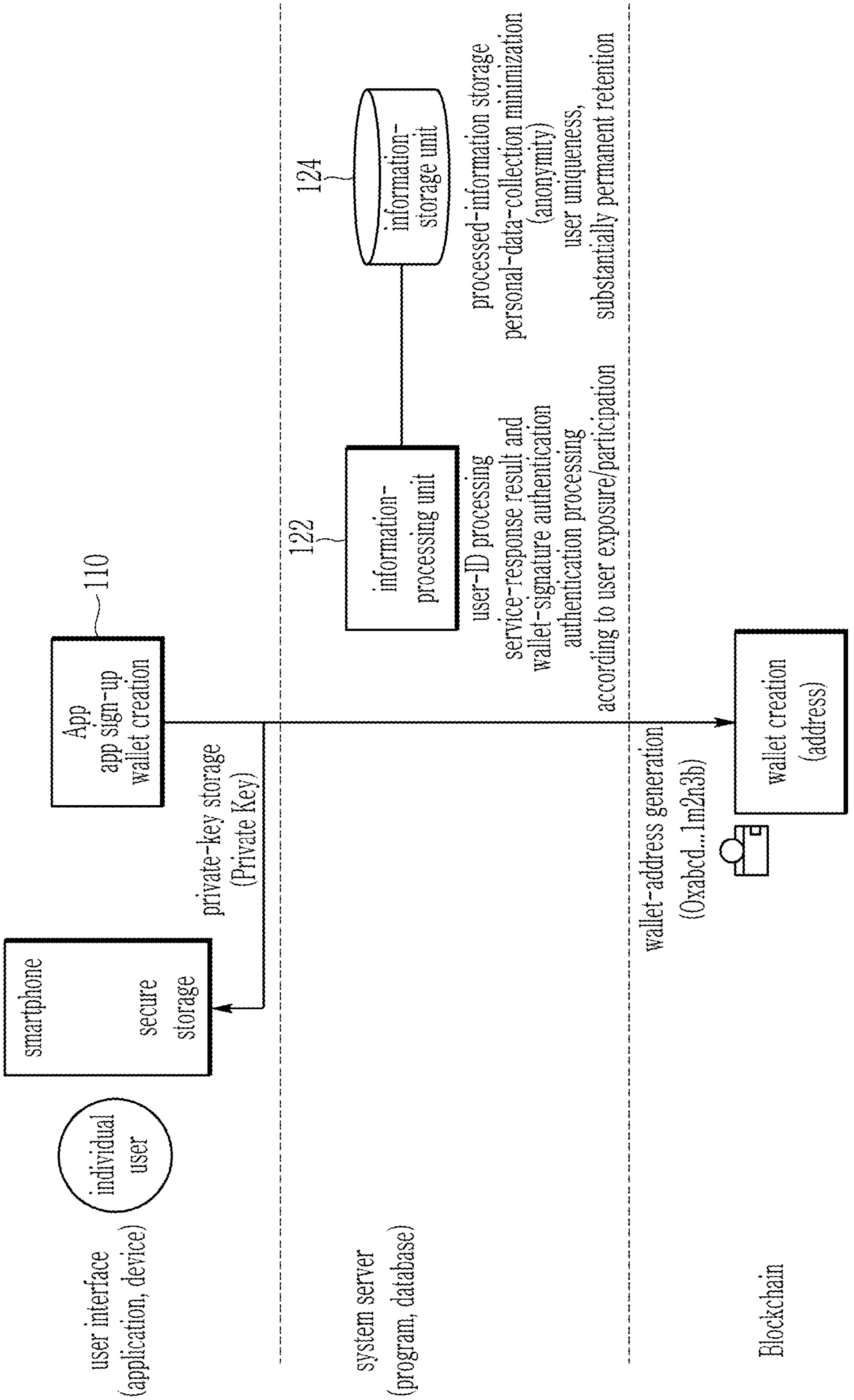
FIG. 2 is a diagram illustrating an overview of wallet-address generation and advertising-identifier usage.

FIG. 2 is a diagram illustrating an overview of wallet-address generation and advertising-identifier usage.

Referring to FIG. 2, the user terminal 110 requests generation of a wallet address on the blockchain on the basis of user consent. The generated wallet address is stored on the blockchain (e.g., within the blockchain node). Additionally, the private key associated with wallet-address generation is stored in a memory (secure storage) within the user terminal 110. Additionally, the information-storage unit 124 stores the information processed by the information-processing unit 122. Here, storing the processed information is predicated on minimizing the collection of personal data, thereby ensuring user anonymity while maintaining user uniqueness in a substantially permanent manner.

Figure 3:
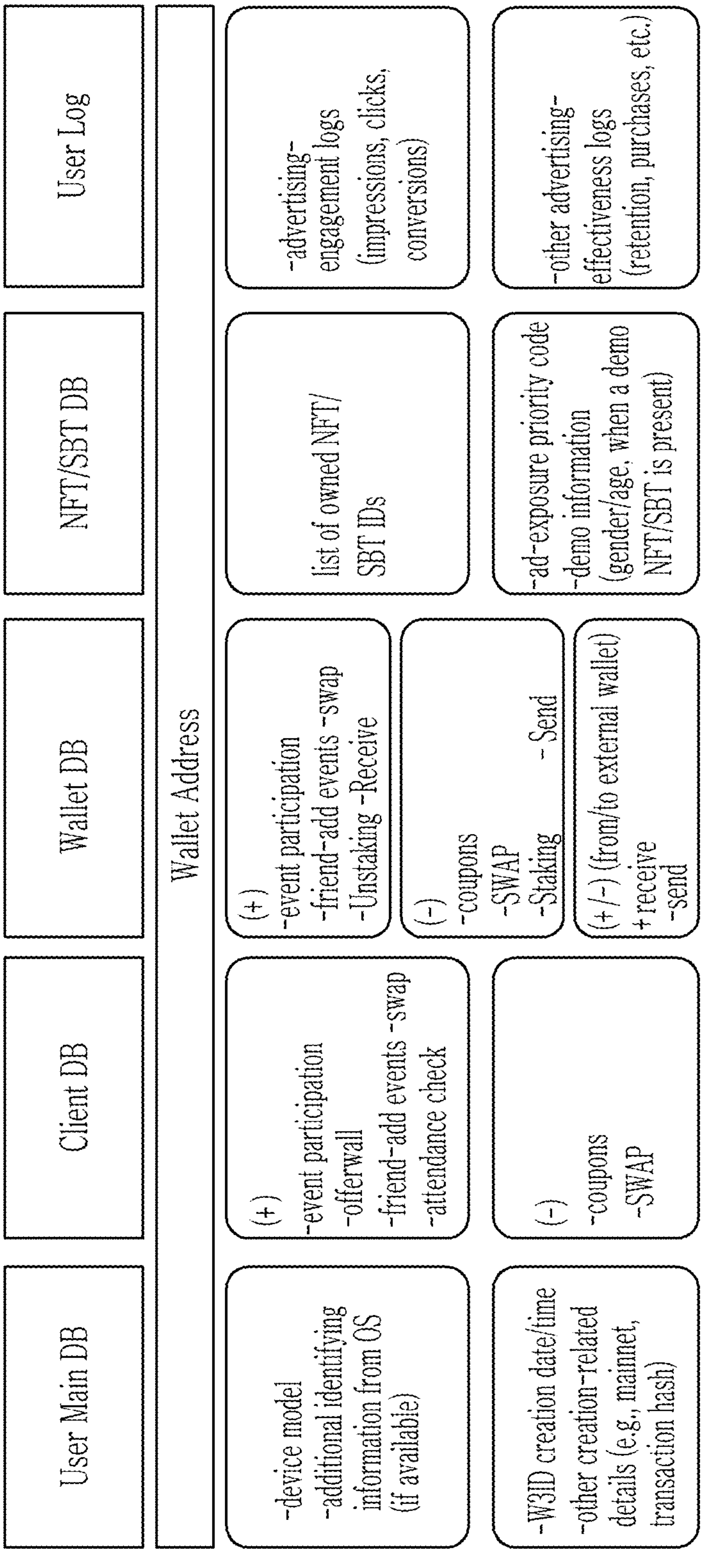
FIG. 3 is a diagram illustrating an example of a Web3ID user database.

FIG. 3 is a diagram illustrating an example of a Web3ID user database.

Referring to FIG. 3, illustrated is an example of a Web3ID user database provided in—and utilized by—the system server 120, wherein each individual database is matched to user information through the wallet address of the Web3ID.

The user main database ("User Main DB") stores: (i) user-identification information that can be additionally obtained within each device environment; and (ii) Web3ID creation information—such as the creation date/time, network environment, and the like. The client database ("Client DB") is a user database specific to the medium that employs the Web3ID, and its structure may vary according to the characteristics of that medium.

The wallet database ("Wallet DB") stores digital-asset information of the Web3ID wallet (which may be deleted depending on the characteristics of the medium), whereas the NFT/SBT database ("NFT/SBT DB") functions as an information database for advertising targeting and stores data that combines: (i) SBT/NFT information—including advertising-attribute information generated on the blockchain network—and (ii) priority information for ad exposure. The user log ("User Log") is responsible for recording, via the Web3ID, data on advertising engagement and associated performance metrics.

Figure 4:
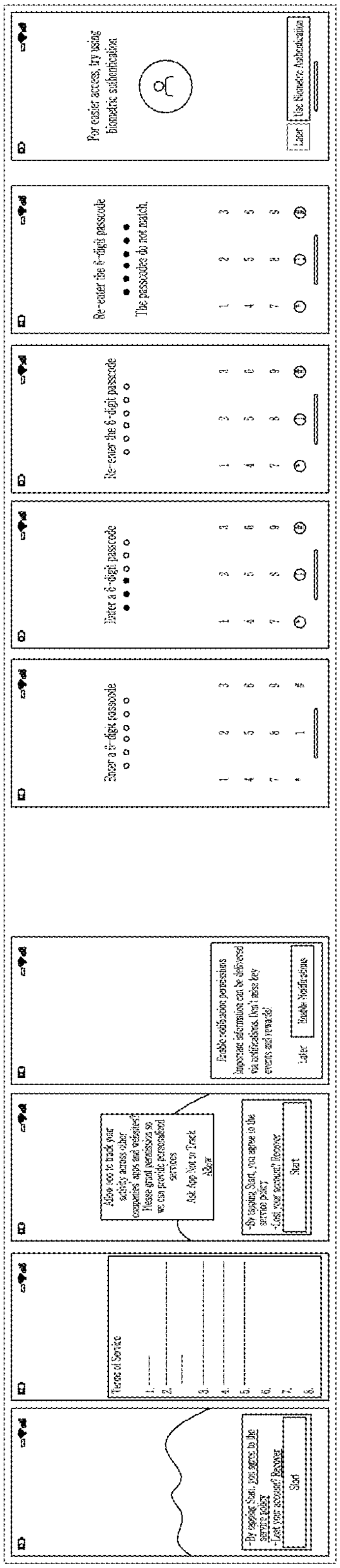
FIG. 4 is a diagram illustrating a procedure for creating an account and generating a wallet address.

FIG. 4 is a diagram illustrating a procedure for creating an account and generating a wallet address.

Referring to FIG. 4, during user registration, an automatic blockchain-based wallet address is generated once the user (i) completes the terms-of-service consent procedure and (ii) enters a personal identification number (PIN) code, without any additional steps. At this stage, no separate identity is performed during sign-up; such verification is conducted later.

When the blockchain wallet is generated, the user-specific mnemonic, private key, and the like are stored in (i) a personal database under the user's control and (ii) the user's mobile device. When a wallet signature is required within the service, the user performs the operation by entering the previously stored PIN code or by using a biometric authentication method configured on the mobile device (e.g., facial recognition or fingerprint recognition).

Figure 5:
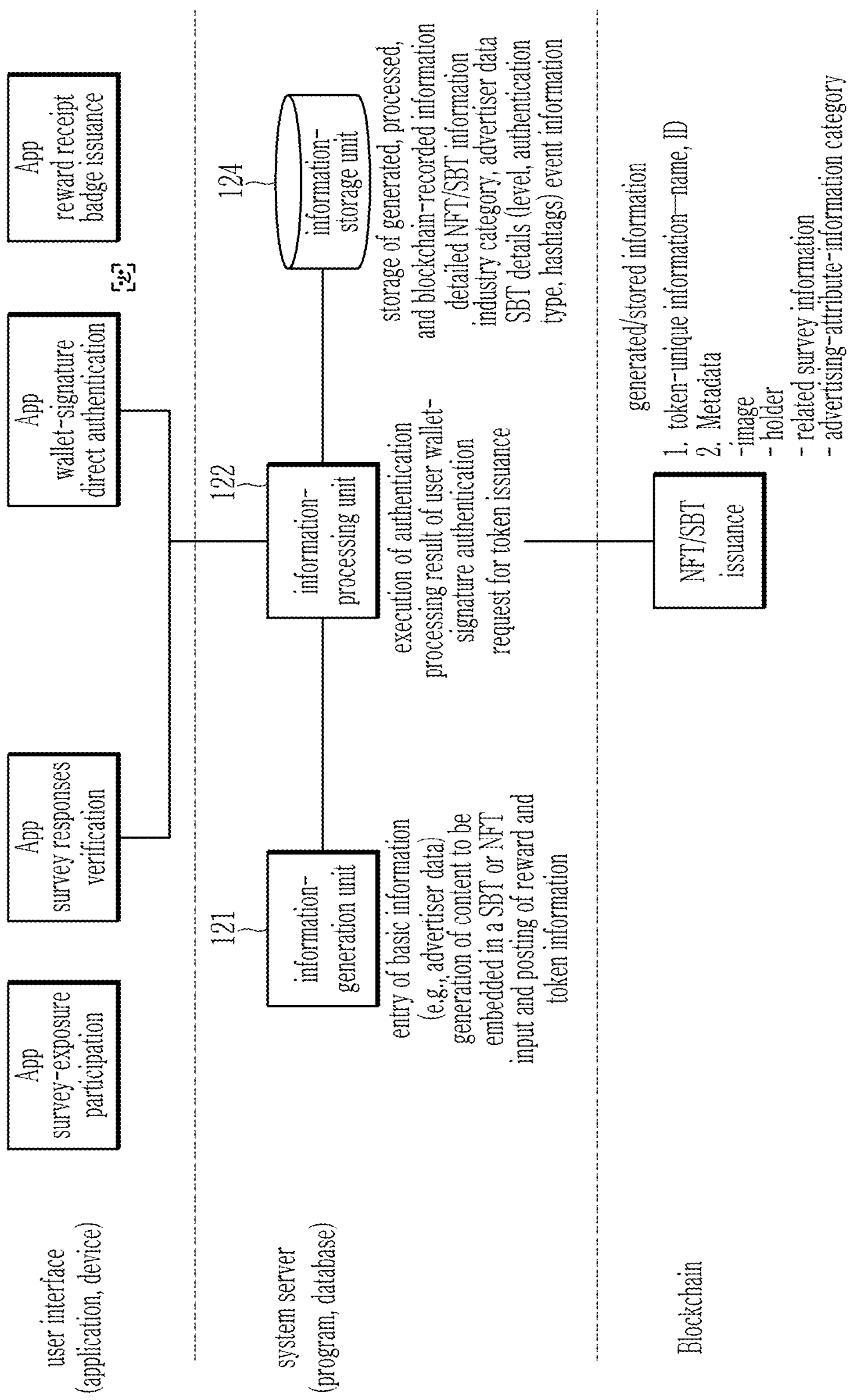
FIG. 5 is a diagram illustrating an overview of issuing and recording NFTs and SBTs for advertising-attribute information obtained directly from a user.

FIG. 5 is a diagram illustrating an overview of issuing and recording NFTs and SBTs for advertising-attribute information obtained directly from the user.

Referring to FIG. 5, the information-generation unit 121 generates, on the basis of basic information input from the user terminal 110, the information that is to be embedded in a SBT or NFT. Additionally, the information-generation unit 121 receives reward and token information and publishes it accordingly.

The information-storage unit 124 stores (i) the information generated by the information-generation unit 121, (ii) the information processed by the information-processing unit 123, and (iii) the information recorded and stored on the blockchain (i.e., in the blockchain node 123). Additionally, the information-storage unit 124 may store: (i) detailed information on NFTs and SBTs; (ii) information concerning industry categories and advertisers; and (iii) event data related to SBT particulars—such as level, authentication type, hashtags, and the like.

Figure 6:
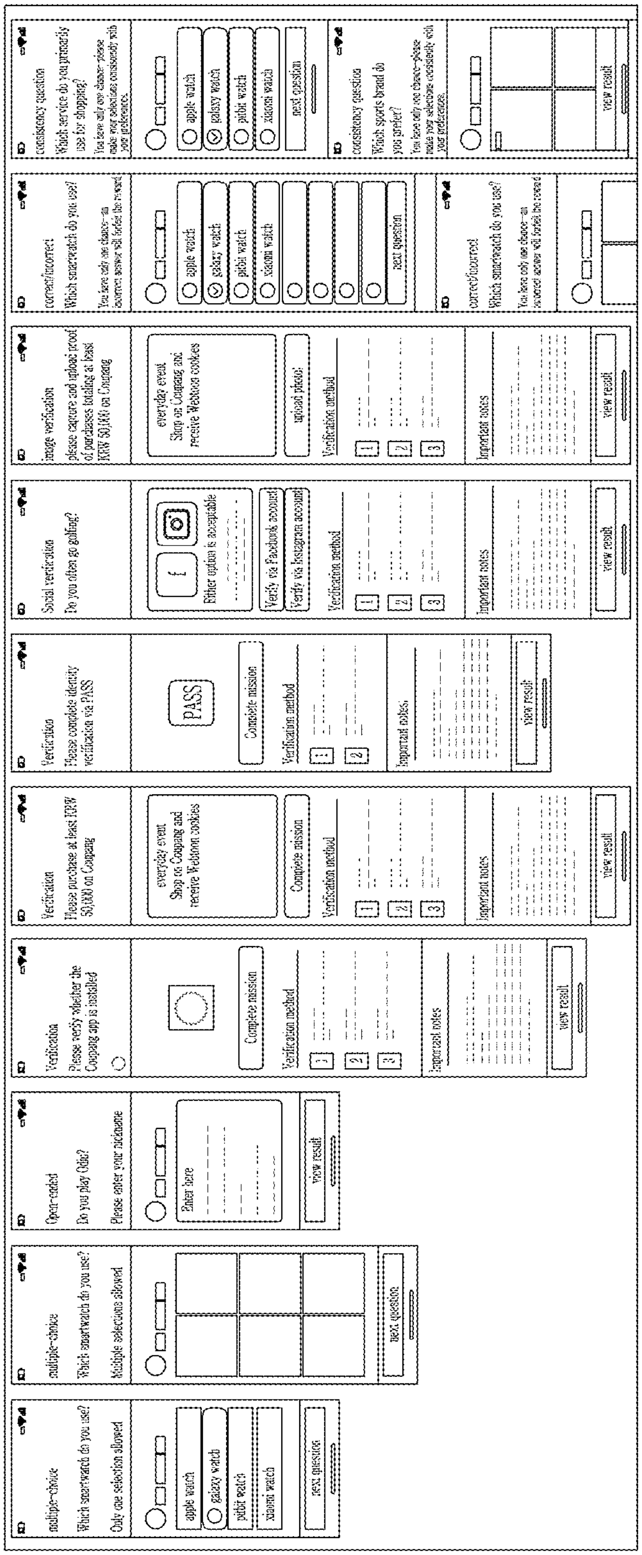
FIG. 6 is a diagram illustrating exemplary authentication types for various advertising-attribute identification activities.

FIG. 6 is a diagram illustrating exemplary authentication types for various advertising-attribute identification activities.

Referring to FIG. 6, the survey may include, for example, a multiple-choice survey (list or image-based), a quiz-type survey (answer verification), and a subjective survey (free-text entry), among others. The authentication types may include, for example: verification of whether an application is installed (Android); verification of whether a specific action has been performed on a web page or within an application (tracker authentication); verification of whether a particular post has been uploaded to, or liked on, a social-networking service such as Facebook or Instagram; badge-image upload authentication (capturing and uploading a photo evidencing ownership, purchase, or use); badge-image OCR authentication (capturing a screen that verifies installation of a specific application on iOS); and consistency authentication (verifying authenticity by checking the consistency of answers within a questionnaire), among other possibilities.

Figure 7:
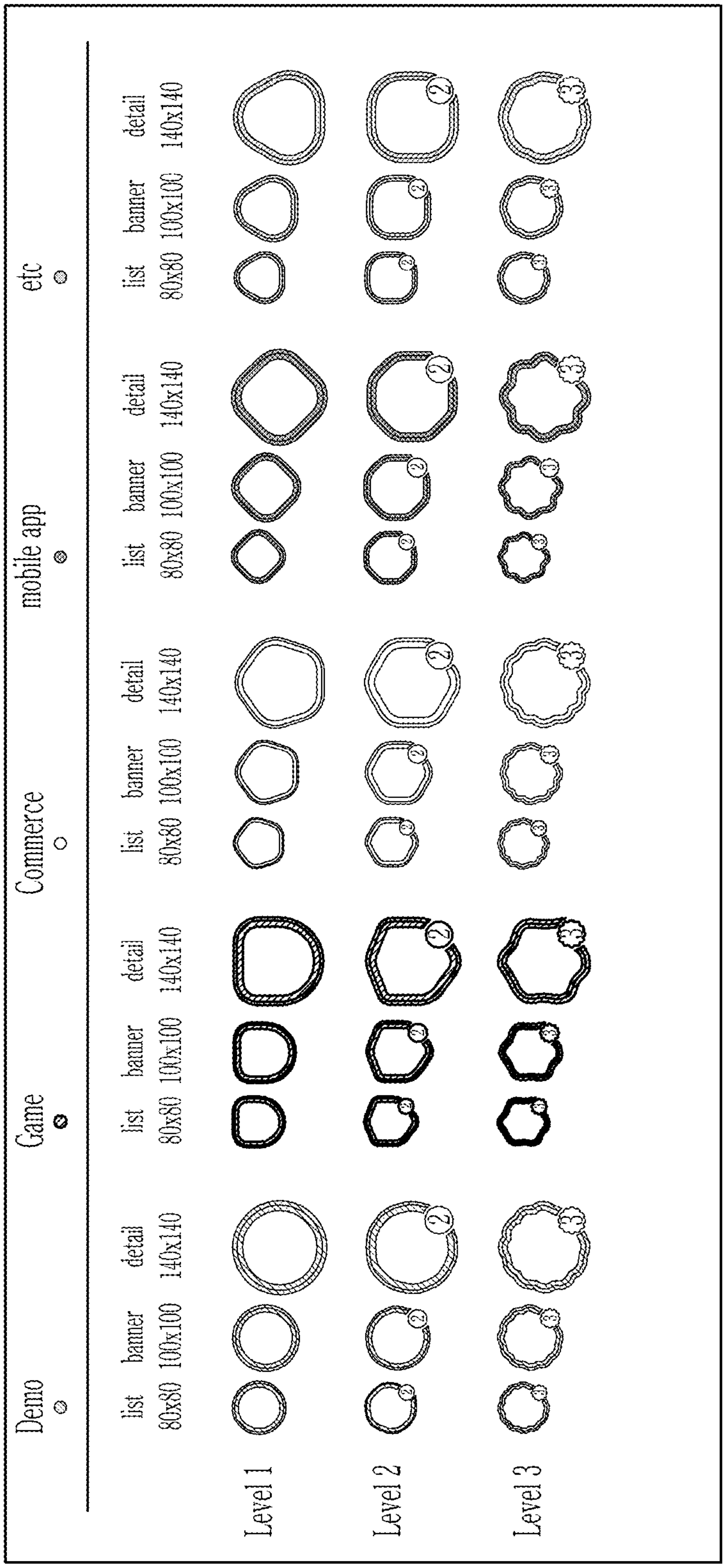
FIG. 7 is a diagram illustrating images of SBTs and NFTs by respective type.

FIG. 7 is a diagram illustrating images of SBTs and NFTs, categorized by type.

Referring to FIG. 7, the user's attributes are implemented as various types of SBTs and NFTs, and those attributes are classified by category and level. Segmentation by domain distinguishes items as Demo, Game, Commerce, Mobile App, and the like, while segmentation by rarity classifies them into Levels 1-3. The various SBT and NFT images shown in FIG. 7 are rendered with distinct designs corresponding to the above-described categories and attributes (i.e., rarity), thereby enabling easy visual recognition.

Figure 8:
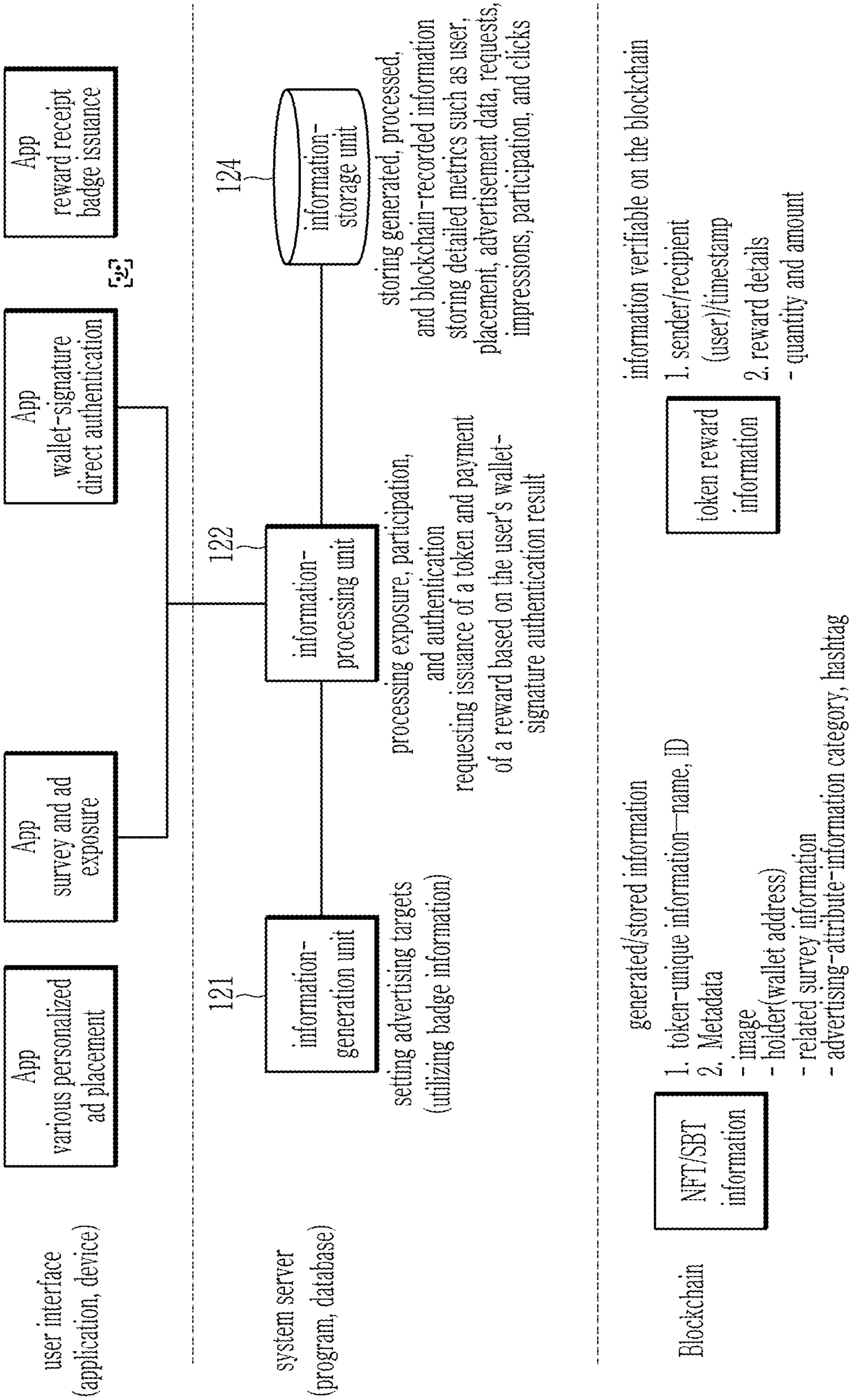
FIG. 8 is a diagram illustrating an overview of target marketing using Web3ID (wallet address and badges).

FIG. 8 is a diagram illustrating an overview of target marketing using Web3ID (wallet address and badges).

Referring to FIG. 8, the information-generation unit 121 sets the advertising target by utilizing badge information, and the information-processing unit 122 (*i*) performs authentication processing according to user exposure and participation, and (ii) requests issuance of an NFT or SBT and payment of a reward based on the result of the user's wallet-signature authentication.

The information-storage unit 124 stores: (i) the information generated by the information-generation unit 121; (ii) the information processed by the information-processing unit 122; and (iii) the information recorded and stored on the blockchain (i.e., in the blockchain node 123). Additionally, the information-storage unit 124 may store detailed data concerning users, ad placements (media inventory), and advertisements, including requests, impressions, participation metrics, clicks, and the like.

Meanwhile, the verifiable information stored on the blockchain may include sender- and recipient-related information (for example, a user identifier and a timestamp) as well as reward-related information (for example, a quantity and an amount).

Figure 9:
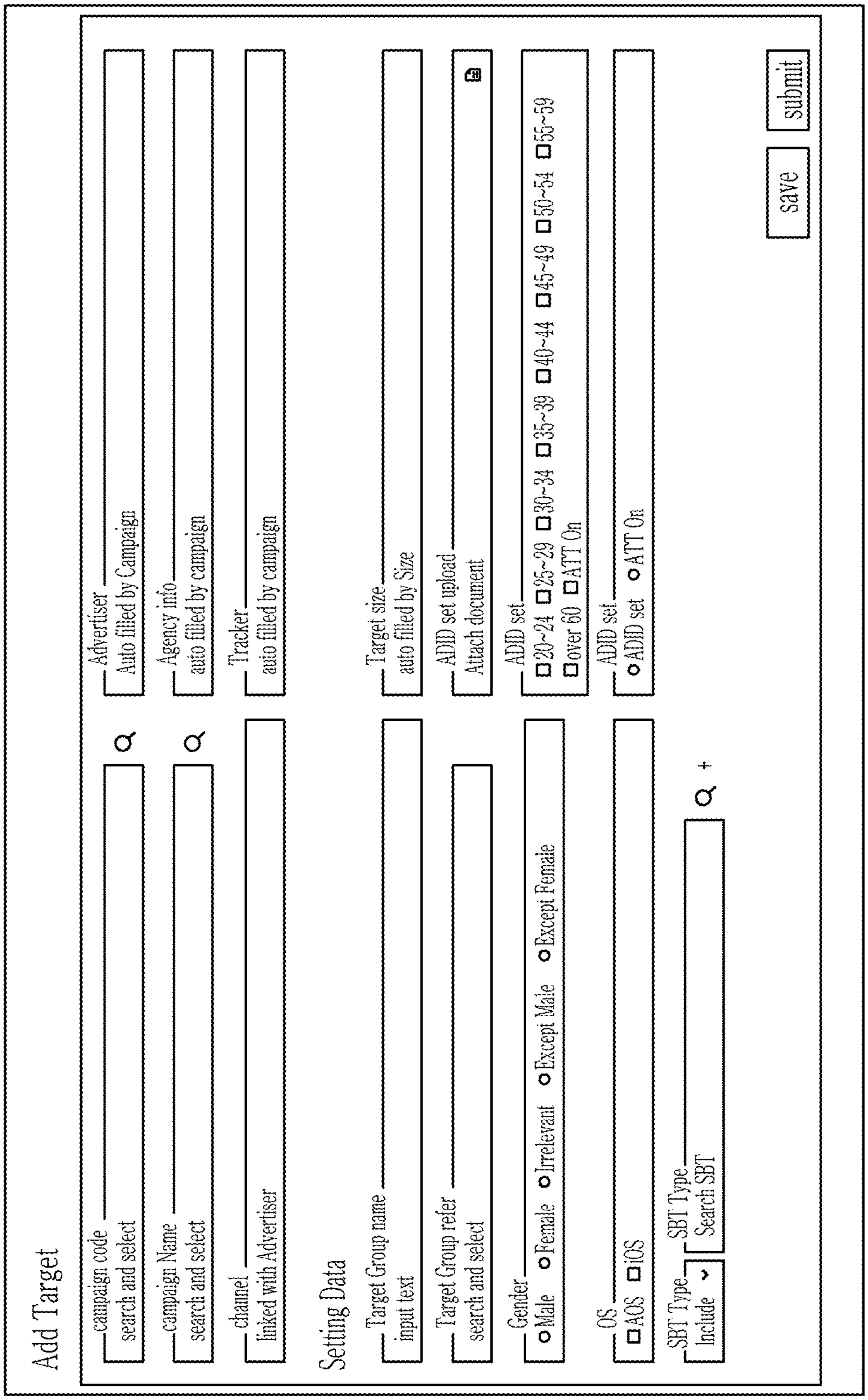
FIG. 9 is a diagram illustrating a screen for setting targeting conditions.

FIG. 9 is a diagram illustrating a screen for setting targeting conditions.

Referring to FIG. 9, illustrated is a target-group screen that permits NFTs/SBTs to be designated as targeting criteria, in addition to gender, age, OS, and conventional advertising identifiers. Accordingly, by flexibly configuring a diverse set of targeting conditions, broader target marketing can be carried out.

As explained above, the target-marketing system of the present invention—which employs, as an identifier, a combined ID generated from a wallet address and advertising-attribute information—stores (i) the wallet address of a blockchain network and (ii) various advertising-attribute information obtained directly from the user as respective unique and immutable Soul-Bound Tokens (SBTs) on the blockchain. By using the combined ID (referred to herein as "Web3ID") formed by linking these tokens as the identifier for digital marketing, the invention improves information accuracy and enhances the efficiency of invigorating the target-marketing market, particularly the mobile target-marketing segment.

Additionally, by storing the wallet address and the advertising-attribute information as SBTs and employing the resulting combined ID as the identifier for digital marketing, the system does not require construction of a separate OS-level infrastructure even when the identifier must be replaced owing to handset replacement, thereby reducing the costs associated with building such an OS-level system.

Although the invention has been described in detail with reference to preferred embodiments, it is not limited thereto; rather, various modifications and applications may be made without departing from the spirit and scope of the invention, as will be readily appreciated by those of ordinary skill in the art. Accordingly, the true scope of protection of the present invention should be interpreted in accordance with the following claims, and all technical concepts within the scope of equivalents thereof are to be regarded as falling within the scope of the present invention.

DESCRIPTION OF SYMBOLS

100: target-marketing system that employs—as an identifier—a combined ID formed from a wallet address and advertising-attribute information (present invention).
110: user terminal
120: system server
121: information-generation unit
122: information-processing unit
123: blockchain node
124: information-storage unit
130: advertiser terminal

What is claimed is:

1. A target-marketing system that employs, as an identifier, a combined ID generated from a wallet address and advertising-attribute information, the system comprising:

a user terminal configured to request, on the basis of user consent, generation of a wallet address on a blockchain and to perform signing and authentication of the wallet address; and a system server configured to utilize, as a unique advertising identifier for digital marketing, the wallet address generated on the blockchain in response to the request from the user terminal;

issue and store a Soul-Bound Token (SBT) on the blockchain, wherein the SBT is a non-transferable token that is cryptographically bound to the wallet address upon issuance, incorporates advertising-attribute information obtained from the user terminal at a time of issuance of the SBT, and is immutable on the blockchain to prevent alteration of the advertising-attribute information incorporated in the SBT; and employ, as the identifier for digital marketing, the combined ID produced by linking the wallet address serving as the unique advertising identifier with the advertising-attribute information incorporated in the SBT, wherein the system server comprises:

an information-generation unit configured to generate, on the basis of basic information input from the user terminal, token-information to be incorporated in the SBT at the time of issuance of the SBT;

an information-processing unit configured to process user IDs, perform authentication processing for service-response results provided via a user interface and for wallet signatures, perform authentication processing according to user exposure and participation, and request issuance of the SBT including the token-information generated by the information-generation unit and payment of a reward in accordance with a result of a wallet-signature authentication;

a blockchain node configured to generate, in response to the request from the user terminal, the wallet address on the blockchain, store the SBT issued in response to the request from the information-processing unit in association with the wallet address on the blockchain, and record and store token-unique information and metainformation in the SBT; and an information-storage unit configured to store (i) the information generated by the information-generation unit, (ii) the information processed by the information-processing unit, and (iii) the information recorded and stored in the blockchain node.

2. The target-marketing system of claim 1, wherein the system server performs target marketing by utilizing the advertising-attribute information incorporated in the SBT.

3. The target-marketing system of claim 1, wherein the information-generation unit is further configured to publish reward information and token information.

4. The target-marketing system of claim 1, wherein the information-processing unit collects authentication information from the user terminal, stores the collected authentication information in the blockchain node, and authenticates the user on the basis of the stored authentication information.

5. The target-marketing system of claim 1, wherein the information-processing unit analyzes collected advertising-attribute information, issues the SBT on the basis of the analysis, and stores the issued SBT in the blockchain node for management.

6. The target-marketing system of claim 5, wherein the information-processing unit provides personalized advertising to the user by utilizing the SBT.

7. The target-marketing system of claim 1, wherein the information-processing unit collects advertising-engagement information of the user, records the collected advertising-engagement information in the blockchain node, and analyzes the recorded information to measure effectiveness of target marketing.

8. The target-marketing system of claim 1, wherein the information-storage unit stores SBT detail information, industry category information, advertiser information, and SBT event information.

9. The target-marketing system of claim 1, wherein the token-unique information stored in the blockchain node includes a name and an ID.

10. The target-marketing system of claim 1, wherein the metainformation stored in the blockchain node includes a SBT image, a holder (wallet address), an advertising-attribute-information category, and hashtag information.

* * * * *